United States Patent

Lenkeit et al.

[15] 3,675,418
[45] July 11, 1972

[54] JET ENGINE FORCE FRAME

[72] Inventors: Carl Heinz Lenkeit; Cornelius Stephen Conklin, Jr., both of South Windsor, Conn.

[73] Assignee: United Aircraft Corporation, East Hartford, Conn.

[22] Filed: Nov. 19, 1970

[21] Appl. No.: 90,971

[52] U.S. Cl. ............................60/39.31, 244/54, 248/5, 60/39.32
[51] Int. Cl. ............................F02c 7/20, B64d 27/10
[58] Field of Search ..................244/54; 60/39.31, 39.32; 248/5

[56] References Cited

UNITED STATES PATENTS

| | | | |
|---|---|---|---|
| 2,718,756 | 9/1955 | McDowell | 60/39.31 |
| 3,397,855 | 8/1968 | Newland | 244/54 |
| 2,818,225 | 12/1957 | Kent | 248/5 |
| 3,042,349 | 7/1962 | Pirtue et al. | 248/5 |
| 2,587,345 | 2/1952 | Lombard | 244/54 |
| 3,561,707 | 2/1971 | Strock | 248/5 |

FOREIGN PATENTS OR APPLICATIONS

| | | | |
|---|---|---|---|
| 967,640 | 11/1950 | France | 60/39.31 |
| 1,526,855 | 1/1970 | Germany | 60/39.32 |

Primary Examiner—Carlton R. Croyle
Assistant Examiner—Warren Olsen
Attorney—Jack N. McCarthy

[57] ABSTRACT

Apparatus for transferring the axial forces present in the skin of a thin walled, hollow cylinder with little distortion of the skin is disclosed. The invention permits elimination of substantially all ovalization of a gas turbine jet engine case which results from transferring axial forces in the engine to a second body; under some conditions backbone bending of the engine case is also reduced.

3 Claims, 4 Drawing Figures

PATENTED JUL 11 1972 3,675,418
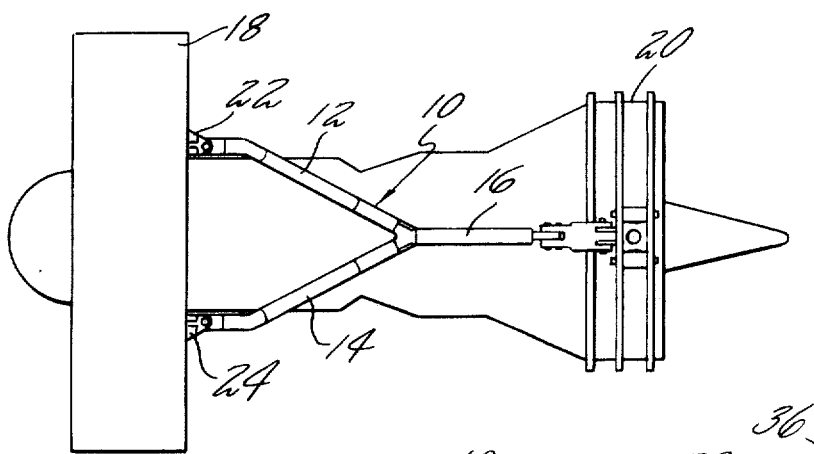
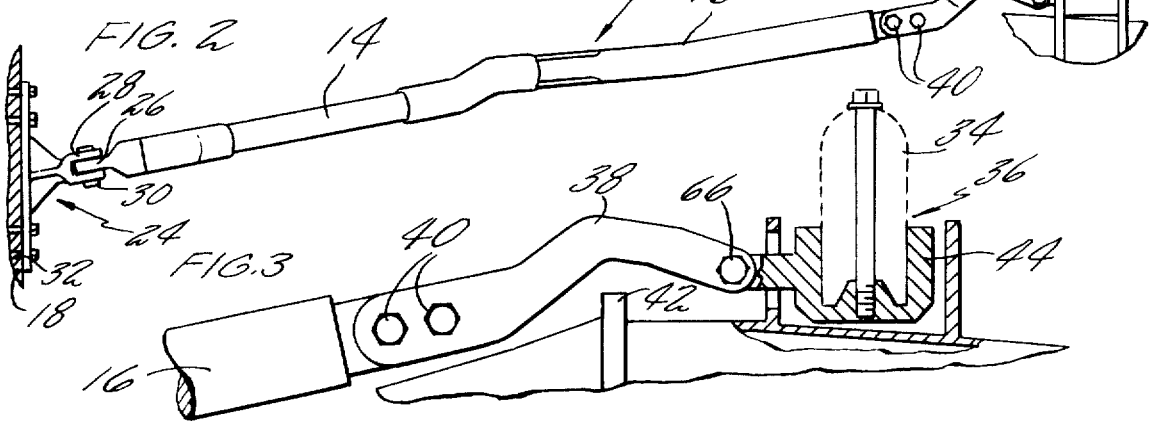
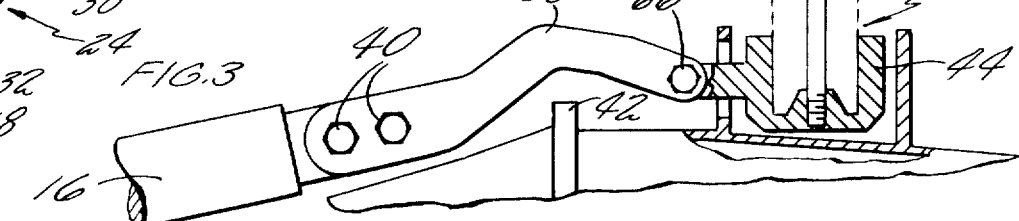
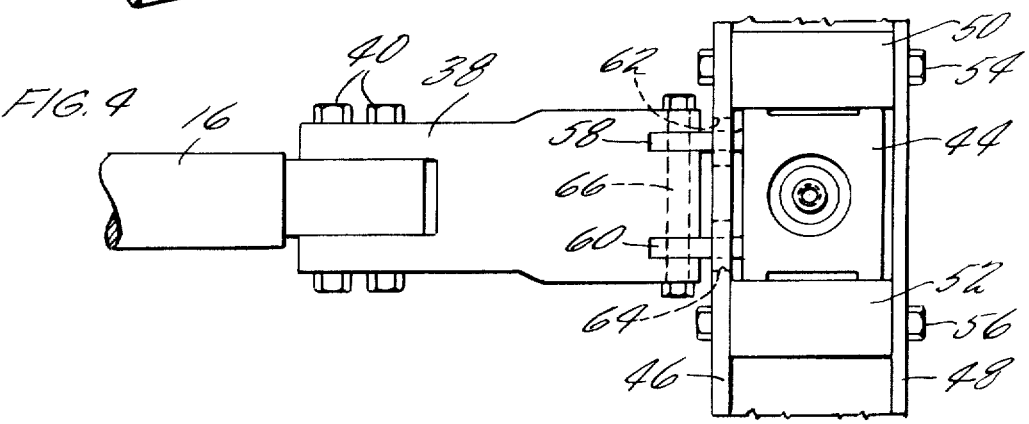
INVENTORS
CARL HEINZ LENKEIT
CORNELIUS STEPHEN CONKLIN, JR.

JET ENGINE FORCE FRAME

BACKGROUND OF THE INVENTION

1. Field of Invention

This invention relates to gas turbine jet engines and more particularly to gas turbine engine structure for transmitting engine axial forces to a second body.

2. Description of the Prior Art

Jet type engines are a principal means of propulsion for both commercial and military aircraft. The current technology jet engines are economical, reliable and lightweight, and they are characterized by a high thrust-to-weight ratio. These features are the consequence of precise design effort and the application of advanced engineering in which engine components are sometimes operated approaching their ideal structural capacity.

When jet propulsion was being integrated into the aviation industry for the first time, jet engines were relatively low-thrust, heavy machines having a typical thrust-to-weight ratio of approximately three to one. As more experience was accumulated, the generated thrust rating was increased while the corresponding weight of the engines was reduced through the application of advanced engineering and technology. For example, new high temperature materials, better assembly techniques and closer fitting of cooperating engine components were just some of the advancements which allowed reliable, lighter weight engines. The present generation of jet engines is the most powerful ever built having a typical thrust-to-weight ratio of approximately five. Bending, flexing and other structural phenomenal due to the increased size and loading of engine components have been observed in many of the present high performance jet engines; some of these phenomena have gone unnoticed initially because of their small magnitude or because they were masked by other perturbations, but other bending and flexing situations have required structural modifications as the engine designs progress. With the aid of hindsight, some of these situations did exist with the smaller, lower performance, early jet engines, however, the bending and flexing did not exceed a tolerable limit and presented no operational difficulty.

One of the problems which went unnoticed during the era of the small jet engine but which now requires special attention is the deviation from a circular geometry (hereinafter referred to as ovalization) experienced by the high thrust jet engines. When such an engine transfers the thrust forces it generates to a second body through a single transfer point which is off the axial center line of the engine, the thrust being generated on the center line, the skin or shell of the engine tends to ovalize. The effect of excessive ovalization in an engine is intolerable wear due to rubbing between the rotary and stationary portions of the engine, and poor fuel economy due to the change in clearance dimensions in the engine.

SUMMARY OF THE INVENTION

A main object of the present invention is to transmit axial forces developed in a jet engine from the engine to a second body with reduced ovalization of the engine.

The present invention provides apparatus for transferring a distributed axial force loading from a first body, typically a jet engine case which is a thin-skin, hollow, cylinder-like body, to a second body, typically an airframe, through a single axial load pickup member which is located away from the axial centerline of the engine, with reduced ovalization of the engine case. In one preferred embodiment, a pair of lugs, attached to the forward or inlet end of an engine, transmits the engine axial forces from the engine case to a single axial load pickup member which is attached to an airframe at the rear or exhaust end of the engine through a wishbone-shaped frame which is attached to the lugs.

An advantage of the present invention is the improved specific fuel consumption which results due to the maintenance during operation, of various engine clearances closer to the designed clearances than would otherwise occur.

A feature of the present invention is the employment of more than one axial force transfer point along the circumference of the case of a jet engine.

The foregoing and other objects, features and advantages of the present invention will become more apparent in the light of the following detailed description of a preferred embodiment thereof as illustrated in the accompanying drawings.

DESCRIPTION OF THE DRAWING

FIG. 1 is a schematic top view of a jet engine which has a force frame to transmit the engine axial forces from the fan exit case to an axial load pickup member located in the turbine exhaust case in accordance with a preferred embodiment of the present invention;

FIG. 2 is a broken-away side elevation view of the force frame in accordance with a preferred embodiment of the present invention;

FIG. 3 is a broken-away, schematic side view of attachment means between the force frame and the sliding block in accordance with a preferred embodiment of the present invention;

FIG. 4 is a broken-away, schematic top view of the sliding block assembly in accordance with a preferred embodiment of the present invention.

DESCRIPTION OF THE PREFERRED EMBODIMENT

The geometric relationship between a jet engine case and one embodiment of a force frame in accordance with the present invention is shown in FIG. 1; FIG. 2 shows a force frame 10 in greater detail in an elevation view. The force frame 10 is a wishbone-shaped member having a pair of forward legs 12 and 14 and a rear leg 16. The force frame is connected at the fan exit case 18 and at the turbine exhaust case 20 of the engine. Forward legs 12 and 14 are connected to rigid members or brackets 22, 24 respectively shown in greater detail in FIG. 2. The leg 14 has an extended projection 26 and fits into a female lug 28 which is an integral part of bracket 24; the lug 28 and the extended projection 26 are connected by a bolt 30 which passes through each of them. The leg 12 is connected in a like manner to its cooperating bracket 22. The brackets 22 and 24 have bolt holes 32 for attachment to the engine fan case 18.

The brackets 22, 24 are attached to the engine at a location which forms an arc of 120° between the forward legs 12, 14 with the legs being symmetrically located about a vertical line in a plane normal to the axial center line of the engine; each bracket is bolted to the engine fan case.

The rear leg 16 of the force frame is connected to an axial load pickup member 34 through a sliding block assembly 36 as is shown generally in FIG. 2 and in greater detail in FIGS. 3 and 4. The rear leg 16 is rigidly attached to a goosenecked extension 38 by a pair of bolts 40; the member 38 is present and so shaped to avoid a flange 42 which is essential to engine structural integrity.

A thrust block 44 is slidably mounted between a pair of mount rails 46, 48 and a pair of slider blocks 50, 52; the thrust block is free to move along the slider blocks within the confines of the mount rails as will occur when various engine dimensions change due to temperature and load variation of the engine. The slider blocks 50, 52 are rigidly held between the mount rails 46 and 48 by the bolts 54, 56 respectively.

The thrust block 44 having a pair of protruding members 58, 60 which extend through the holes 62 and 64, respectively in the mount rail 46 is pin connected to the extension 38 by a bolt 66.

During operation, an airplane mounted jet engine experiences axial forces at various locations in the engine; these forces are due to forward and reverse thrusts and inertial loads and are transmitted through various engine bearings and other structures and appear in the engine skin or shell. If these forces were transmitted from around the entire circumference of the engine uniformly to the body being propelled, little engine distortion would result. Actually, many airframe engine mountings require that the axial forces be transferred by the engine to the airframe at one thrust pickup member leading to two structural phenomena, ovalization of the engine case and backbone bending of the engine case.

Ovalization is the cross-sectional deviation of an engine case from circular to elliptical geometry. Ovalization occurs when forces which are essentially uniformly distributed in a thin wall cylinder and are acting in a direction parallel to the axial center line of the cylinder, are counteracted by a force located at one point on the surface of the cylinder. These conditions are not peculiar to gas turbine jet engines but they are common in jet engines because of the very high axial forces typical in such engines. While ovalization will occur to some degree whenever the above conditions exist, it can become especially aggravated in physically large engines which have cooperating rotating parts to develop high thrust forces. For a given engine with a single axial load pickup member located adjacent to the case of the engine, the degree of ovalization is dependent on magnitude of the axial forces being picked up and is independent of the position on the engine circumference at which the forces are picked up. The engine case becomes elliptical-like in cross section with the long axis of the elliptical shape and the engine axial center line forming a plane which always contains the axial load pickup point. The ovalization is identical whether the axial forces are removed at a given location or at a second location 180° removed from the first.

The present invention capitalizes on this characteristic by using two thrust pickup points separated theoretically by 90° of arc on the circumference of the engine. The force transferred is evenly divided between the two points tending to cause two ovalizations also separated by 90°; the two ovalizations actually cause a cancelling effect upon each other with little overall ovalization of the engine case. One pair of pickup points is preferred from a mechanical simplicity viewpoint, however, two or more pairs of pickup points may be employed depending upon the circumstances of the given engine installation. The essential feature of the compensating ovalizations being that axial forces be transferred from the engine through pairs of thrust pickup members, each member being spaced apart from the cooperating member of the pair by ninety degrees of arc.

A preferred embodiment of the present invention involves grasping the jet engine at two points ideally separated by an arc of 90°; however, the effect on ovalization is the same whether the two points are at the center, the ends, the middle, or any positions intermediate the ends of the engine. The critical feature of the axial force transfer is that the forces be taken from the engine at a pair of points separated by a 90° arc, allowing these points to be at any convenient location between the inlet and exhaust end of the engine.

As indicated, ideal solution to ovalization occurs when the axial forces in the engine case are removed therefrom by a pair of pickup points at stations separated by 90°. However, separation both greater and lesser than ninety degrees may and have been utilized, the greater the separation deviates from ninety degrees, the greater is the degree of engine ovalization experienced. In the limit, the two pickup points are separated either by 0° or by 180° and at either of these separations the amount of ovalization is the same as if the two force pickup points were replaced by one positioned at either extreme location.

On embodiment of the present invention has the two force pickup points separated by 120° of arc which is admittedly not ideal in terms of minimization of engine case ovalization. The indicated separation is an engineering compromise necessitated by the interference of various auxiliary components outside of the engine case; the effect of the additional thirty degrees separation is an acceptable amount of ovalization, however, there is also a windfall in a sense with respect to the aforementioned backbone bending.

Backbone bending is the bending of the jet engine case at intermediate positions due to the forces acting at the locations of support of the engine case by the airframe. A typical instance of backbone bending occurs when a jet engine having a forward and a rear mount plane, each of which contains a multiplicity of engine support connections, has one thrust transfer point which is located on the exhaust end of the engine and off the axial center line of the engine. The reaction to the axial loading creates a force, acting on the engine and having a moment arm equal to the separation distance between the transfer point and the engine axial center line; this force and moment arm cause a bending moment which is countered by an equal and opposite reaction provided at the mount planes. The net effect is an engine subjected to a system of loads which can cause radial deflection of the engine case and mechanical interference between the case and rotating parts of the engine.

The smaller engines of the early generation jet engines had both ovalization and backbone bending present although neither phenomenon required any special structural adjustment to the engine for several reasons. For example, the clearances between the rotating parts and the stationary parts of the engines were relatively large in the early engines; wide clearances between cooperating components allowed a relatively large engine distortion before any structural interference was apparent.

Further, the early engines tended to be relatively low thrust machines made up of components which were relatively small; some of the more recent engines are substantially larger and the degree of distortion or bending in such engines is more pronounced.

Also, it was convenient from a mechanical interference point of view that backbone bending and ovalization operated to mask one another. More specifically, in a typical installation wherein the jet engine is mounted beneath the wing and has a single axial force pickup point at the exhaust end of the engine, there is a bending moment on the engine equal to the product of the thrust load and the distance between the thrust pickup point and the engine axial center line. This moment is counteracted by an oppositely acting reaction resulting in a bowing or backbone bending of the engine case in an upward direction. If the amount of bow exceeded the engine blade tip clearance mechanical interference could result. However, with ovalization superimposed, the top and bottom of the engine case actually distorted away from the shaft avoiding mechanical interference until perhaps the ovalization became so severe that the drawn-in sides of the case contacted the rotary blades.

Although the invention has been shown and described with respect to a preferred embodiment thereof, it should be understood to those skilled in the art that the foregoing and other changes and omissions in the form and detail thereof can be made therein without departing from the spirit and the scope of the invention, which is to be limited and defined only as set forth in the following claims.

Having thus described typical embodiments of my invention, that which I claim as new and desire to secure by Letters Patent of the United States is:

1. Apparatus for transmitting axial forces to a second body from a gas turbine jet engine enveloped within a case of substantially circular cross section and having an axial center line, including:

two attachment members adapted to be connected to the engine case at stations separated by an arc measured about the circumference of the case at substantially the same axial location;

an axial load pickup member adapted to be connected to the second body for transmitting the axial loads thereto;

means supporting said pickup member on said engine case in circumferential restraint, while permitting limited axial motion thereof, and at a station spaced axially and circumferentially from said attachment members; and a force frame having a single rear leg connecting each of said attachment members to said pickup member and shaped generally to follow the contour of the outer periphery of the engine case and with the single rear leg of the force frame extending substantially axially.

2. The apparatus according to claim 1 wherein the two attachment members have attachment stations separated by an arc of about 90°.

3. The apparatus according to claim 1 wherein the two attachment members have stations separated by an arc of about 120°.

* * * * *